United States Patent
Bendall

(10) Patent No.: US 9,532,031 B1
(45) Date of Patent: Dec. 27, 2016

(54) METHOD FOR EXTRINSIC CAMERA CALIBRATION USING A LASER BEAM

(71) Applicant: The United States of America as represented by the Secretary of the Navy, Washington, DC (US)

(72) Inventor: Charles S. Bendall

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 500 days.

(21) Appl. No.: 14/247,969

(22) Filed: Apr. 8, 2014

(51) Int. Cl.
*H04N 17/02* (2006.01)
*H04N 13/02* (2006.01)
*H04N 13/00* (2006.01)

(52) U.S. Cl.
CPC ...... *H04N 13/0246* (2013.01); *H04N 13/0022* (2013.01)

(58) Field of Classification Search
CPC ............ H04N 13/0246; H04N 13/0022; G06T 7/0018
See application file for complete search history.

(56) References Cited

U.S. PATENT DOCUMENTS

2006/0184274 A1* 8/2006 Sakai ................... G05D 1/0246
700/245
2006/0193179 A1* 8/2006 England ............... G01C 15/002
365/185.22

OTHER PUBLICATIONS

Gauci, J., Zammit-Mangion, D., "Setup Considerations for Calibration of a Stereovision System for Long Range Obstacle Detection", IEEE Communications, Control and Signal Processing, 3rd International Symposium on Digital Objects, 2008, pp. 1091-1095.
(Continued)

*Primary Examiner* — Zhubing Ren
(74) *Attorney, Agent, or Firm* — SPAWAR Systems Center Pacific; Kyle Eppele; Ryan J. Friedl

(57) ABSTRACT

A method involves mounting a laser on a rotation device with azimuth and elevation degrees of freedom, locating the rotation device at a distance from the locations of two or more cameras, orienting each camera so the origin of a laser beam is imaged onto each camera, measuring the distance between each camera origin and the laser aperture, projecting the laser beam through a sequence of precisely determined azimuth and elevation orientations, using each camera collecting laser beam images as the laser is projected through the sequence, and using the laser beam images to determine a set of rotation matrices R and translation vectors T. Using R and T, a point in a laser coordinate frame is translated into a coordinate frame of each of the cameras or a point in a coordinate frame of one camera is translated into a coordinate frame of another camera.

15 Claims, 6 Drawing Sheets

(56) References Cited

OTHER PUBLICATIONS

Hu, J., Razdan, A., Zehnder, J., "An algorithm to calibrate field cameras for stereo clouds", IEEE International Geoscience and Remote Sensing Symposium, 2008, vol. 2, pp. II-1048-II to 1051.
Marita, T., Oniga, F., Nedevschi, S., Graf, T., Schmidt, R., Camera Calibration Method for Far Range Stereovision Sensors Used in Vehicles, IEEE Intelligent Vehicles Symposium, 2006, pp. 356-363.
Zhang, Z., "Camera calibration with one-dimensional objects", IEEE Transactions on Pattern Analysis and Machine Intelligence, 2004, vol. 26, issue 7, pp. 892-899.
He, X., Zhang, H., Hur, N., Kim, J., Kim, T., Wu, Q., "Complete camera calibration using line-shape objects", IEEE TENCON 2006 Region 10 Conference, 2006, pp. 1-4.

\* cited by examiner

METHOD FOR EXTRINSIC CAMERA CALIBRATION USING A LASER BEAM

FEDERALLY-SPONSORED RESEARCH AND DEVELOPMENT

The Method for Extrinsic Camera Calibration Using a Laser Beam is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102777.

BACKGROUND

Stereoscopic applications require calibration of the intrinsic and extrinsic camera parameters. Intrinsic camera parameters, such as focal length and principal point offset, may be determined using a traditional camera calibration approach such as using a checkerboard of known dimensions. Extrinsic camera parameters, such as the rigid body motions between the camera coordinate systems or between a camera and the laser (or world) coordinate systems, may in some cases also be determined using the checkerboard approach. However, accurate extrinsic camera calibration requires a calibration scene similar in dimension (width and depth) to that of the intended application. The determination of extrinsic parameters in certain applications, such as long-range applications, would require an impractically large checkerboard.

Thus, extrinsic calibration methods for long-range applications generally use an array of 3D control points with accurately known positions in the world coordinate system. Construction of the 3D control points is time consuming, expensive and must be specifically constructed for each test site and stereoscopic application. Accordingly, an extrinsic camera calibration method is needed that does not require an accurate array of 3D control points, that requires minimal setup time, and that naturally expands to the required scene dimensions.

DETAILED DESCRIPTION OF SOME EMBODIMENTS

Reference in the specification to "one embodiment" or to "an embodiment" means that a particular feature, structure, or characteristic described in connection with the embodiments is included in at least one embodiment of the invention. The appearances of the phrases "in one embodiment", "in some embodiments", and "in other embodiments" in various places in the specification are not necessarily all referring to the same embodiment or the same set of embodiments.

Disclosed herein is a method for determining the extrinsic parameters of a camera system for use in stereoscopic or 3D computer vision applications. The extrinsic parameters describe the rigid body motion (e.g. rotation and translation) between the camera and world coordinate systems or between two separate camera coordinate systems. The method may be scaled to encompass more than two camera coordinate systems, as would be recognized by a person having ordinary skill in the art.

The embodiments of the method disclosed herein replace the precisely positioned grids and targets associated traditional calibration methods with a laser mounted on a precision rotation mount with both azimuth and elevation degrees of freedom. The method utilizes the detection of a laser beam projected at precise angles within the calibration scene to determine the rigid body motions between the coordinate systems of interest. The rotation mount may be rapidly and easily deployed to new locations and eliminates the time, expense, and logistic requirements to lay out a traditional calibration scene. The laser beam naturally extends to cover the field of view of the camera and avoids the need to develop calibration scenes tailored for each new geometry.

The disclosed method utilizes the constraints that exist in epipolar geometry described by the camera(s) and laser coordinate systems. The method may be based on alternative relationships that exist between the camera(s) and laser coordinate systems. While one embodiment of the method of extrinsic calibration is discussed with regard to a system containing two cameras, one having ordinary skill in the art will recognize that it could easily be extended to include camera configurations containing additional cameras. The cameras are considered to be generic in the method and it is understood that their specific construction and operation may be optimized for a particular wavelength or wavelength band.

Figure 1:
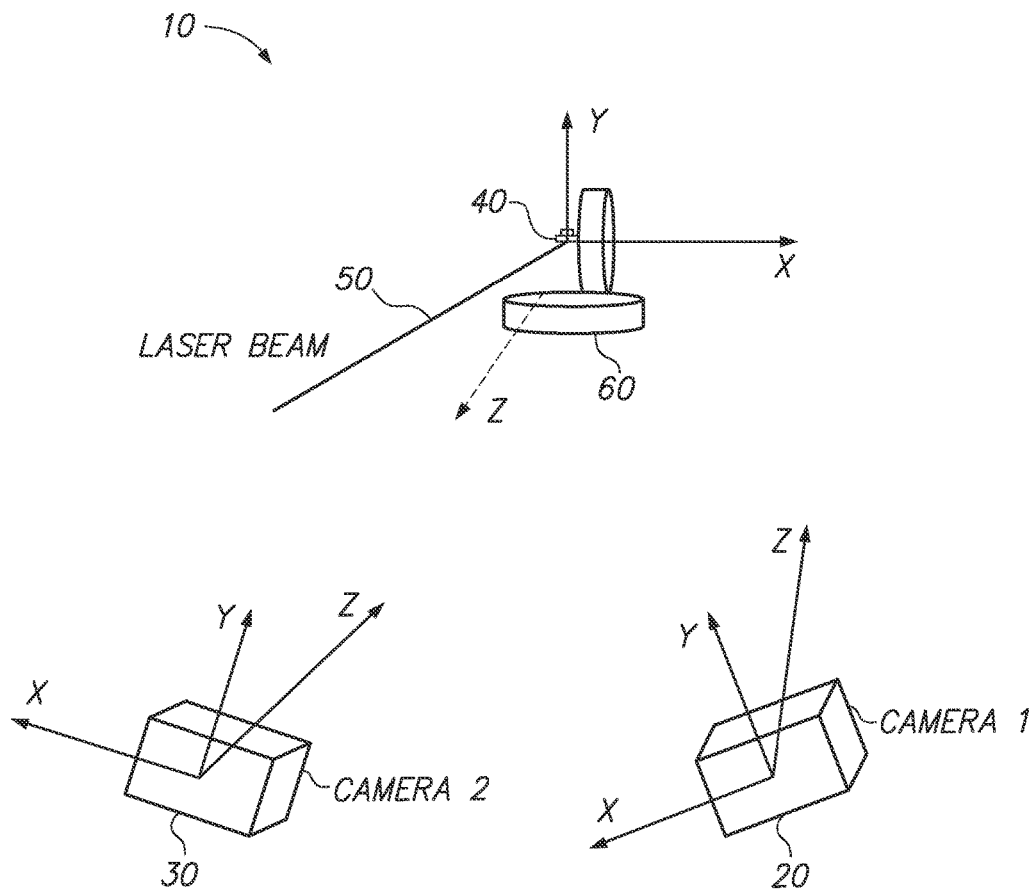
FIG. 1 shows a diagram of a two-camera system and a laser along with their attached coordinate systems.

An extrinsic camera calibration setup is depicted in diagram 10 shown in FIG. 1, which includes a first camera 20, a second camera 30, and a laser 40, each having their own respective coordinate systems. Laser 40 projects a laser beam 50. Laser 40 is mounted to a rotation device 60 having both azimuth and elevation degrees of freedom. In some embodiments, laser 40 is mounted to rotation device 60 such that an aperture of laser 40 is at the center of rotation of rotation device 60. Rotation device 60 is located at a distance from the locations of first camera 20 and second camera 30. First camera 20 and second camera 30 are each oriented such that the origin of laser beam 50 is imaged onto each respective camera.

Figure 2:
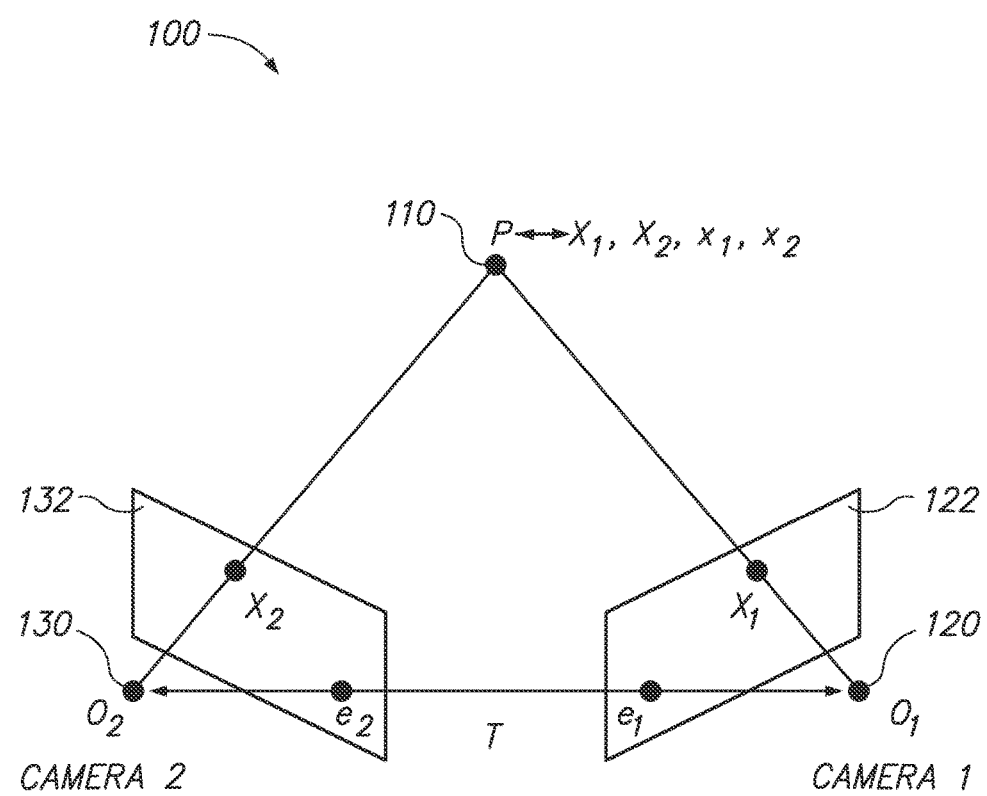
FIG. 2 shows a diagram of the geometry of an approach to extrinsic camera calibration.

FIG. 2 shows a diagram 100 of the geometry of an approach to extrinsic camera calibration. As shown in FIG. 2, the point P 110 is a calibration point in the field of view of both first camera 120 and second camera 130. The point P will be denoted as $X_1$ in the coordinate frame of first camera 120 and $X_2$ in the coordinate frame of second camera 130. In prior calibration methods, it is essential that it is either known or can be determine that the point $X_1$ in the coordinate frame of first camera 120 and the point $X_2$ in the coordinate frame of second camera 130 correspond to the same point P. Since $X_1$ and $X_2$ are the same point, the point $X_1$ in coordinate frame of first camera 120 can be translated into coordinate frame of second camera 130 through (Eq. 1) below, where R is the rotation matrix between the coordinate systems and T is the translation vector. The objective of the extrinsic calibration is to determine R and T.

$$X_2 = RX_1 + T \quad \text{(Eq. 1)}$$

The points $X_1$ and $X_2$ lie in coordinate frames of first camera 120 and second camera 130. However, all that is know about theses points is their projection into the image planes of their respective cameras, 122 and 132. (Eq. 1) can be rewritten in the form of (Eq. 2), where the points in camera frames are expressed in terms of their known locations $x_1$ and $x_2$ in the camera image planes 122 and 132 and their unknown projection constants $\lambda_1$ and $\lambda_2$.

$$\lambda_2 x_2 = \lambda_1 R x_1 + T \quad \text{(Eq. 2)}$$

The first step in the traditional derivation is to compute the cross product of T with (Eq. 2), yielding (Eq. 3):

$$\lambda_2 T \times x_2 = \lambda_1 T \times R x_1 + T \times T \quad \text{(Eq. 3)}$$

Next, the dot product of $x_2$ with (Eq. 3) is calculated yielding (Eq. 4):

$$\lambda_2 x_2 \cdot T \times x_2 = \lambda_1 x_2 \cdot T \times R x_1 = 0 \quad \text{(Eq. 4)}$$

The projection constants can now be eliminated, leaving (Eq. 5), which is known as the epipolar constraint.

$$x_2 \cdot T \times R x_1 = x_2 \cdot E x_1 = 0 \quad \text{(Eq. 5)}$$

The matrix E is known as the essential matrix and is given by the cross product of the translation vector T and the rotation matrix R.

$$E = T \times R \quad \text{(Eq. 6)}$$

Given a sufficient number of corresponding pairs of points $(x_1, x_2)$, the epipolar constraint can be used to solve for T and R.

Using a traditional extrinsic calibration method, there will generally be no distinguishing features on the images of laser beams that can be used. A solution to this problem can be found by reinterpreting the epipolar constraint. The epipolar constraint can be recognized to be in the form of the triple scalar product (see (Eq. 7) for emphasis). Consequently the epipolar constraint can be interpreted as the volume contained in the parallelepiped formed by the vectors $x_2$, T, and $Rx_1$.

$$x_2 \cdot T \times R x_1 = a \cdot b \times c = 0 \quad \text{(Eq. 7)}$$

The epipolar constraint thus has both an algebraic and geometric interpretation. Geometrically, the epipolar constraint implies that the vectors $x_2$, T, and $Rx_1$ lie in a common plane as can be readily seen in FIG. 2.

Figure 3:
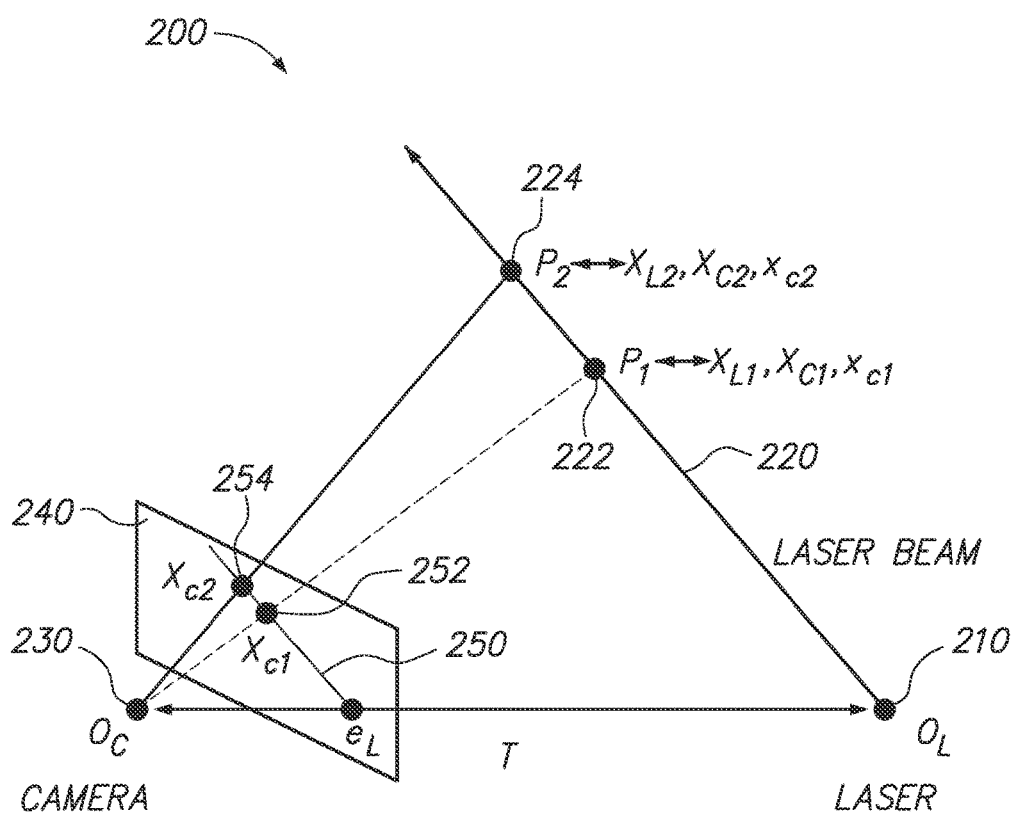
FIG. 3 shows a diagram of the geometry of an approach to extrinsic camera calibration in accordance with the Method for Extrinsic Camera Calibration Using a Laser Beam.

An embodiment of a calibration scene in accordance with the method disclosed herein is depicted in FIG. 3. FIG. 3 shows a diagram 200 of a laser 210, projecting a laser beam 220, and a camera 230 having a camera image plane 240. As shown in FIG. 3, one of the cameras shown in FIG. 2 has been replaced with a laser 210, which is orientated at a specific azimuth and elevation relative to a world coordinate system whose origin corresponds to the laser aperture. Laser 210 is positioned on a rotation device (now shown), such as device 60 shown in FIG. 1 and is capable of changing its azimuth and elevation angles. The azimuth and elevation angles are defined relative to this world coordinate system. To avoid confusion with other usages of the phrase "world coordinate system" this coordinate system will be known as the laser coordinate system but it is understood that the coordinate system is fixed in space and does not move as the orientation of the laser changes.

The point $X_{L1}$ 222 is an arbitrary point lying on the laser beam 220 defined in the coordinate system attached to laser 210. The point $x_{c1}$ 252 is an arbitrary point lying on the image 250 of the laser beam 220 in image plane 240 of camera 230, corresponding to $X_{L1}$ 222. $X_{C2}$ 224 is the unknown point on the actual laser beam 220 in the coordinate system of camera 230, having an origin $o_C$, corresponding to $x_{c2}$ 254. In this case, the geometry is determined by four points ($o_C$, $o_L$, $X_{C2}$ and $X_{L1}$), which in general will not lie in a single plane.

The physical nature of light propagation constrains the vectors from the laser origin $o_L$ to the points $X_{L1}$ 222 and $X_{L2}$ 224 to be collinear and consequently the points $o_C$, $o_L$, $X_{C2}$ 254 and $X_{L1}$ 222 will lie in a common plane. The epipolar constraint will be satisfied for arbitrary points $X_{L1}$ 222 and $x_{c2}$ 254 (i.e. $X_{L1}$ and $X_{L2}$ do not have to correspond to a common point P). Again $X_{L1}$ 222 must undergo the rotation R so that all vectors are in a coordinate system attached to camera 230.

The point P will be the calibration point and will be denoted by $X_C$ in the camera coordinate system and $X_L$ in the laser coordinate system. The calibration procedure is identical for each camera utilized in the setup and to avoid excess notation it will be understood that the subscript C is generic to any camera. The projection of $X_C$ onto the camera image plane will be denoted by $x_c$. In the following discussion, all calibration points P will be points on the laser beam.

Consider an arbitrary point $X_{L1}$ 222 in the laser frame that lies on the laser beam 220 and an arbitrary point $x_{c2}$ 254 in the camera frame that lies on the image 250 of the laser beam. ($X_{L1}$, $x_{c2}$) will correspond to calibration points ($P_1$, $P_2$) where the numerical index in the subscript imply that $P_1$ and $P_2$ will in general be different points. For clarity ($P_1$, $P_2$) corresponds to ($X_{L1}$, $X_{L2}$), ($X_{C1}$, $X_{C2}$) or ($x_{c1}$, $x_{c2}$) depending on the choice of reference frame.

To re-emphasize, $x_{c2}$ 254 and $X_{L1}$ 222 are arbitrary points in the camera image plane 240 and the laser coordinate system and no knowledge is available on their relative positions in a common reference frame. However, from inspection it is shown that as long as laser beam 220 propagates in a straight line, the vectors $X_{C2}$, T and $RX_{L1}$ will lie in a plane and thus satisfy the geometric interpretation of the epipolar constraint.

From (Eq. 4), the relevant epipolar constraint (Eq. 8) can be derived by retaining the projection constant $\lambda_{L1}$. (Eqs. 5 and 8) are similar but the points $x_{c2}$ and $X_{L1}$ in (Eq. 8) are not required to correspond to the same calibration point P on the laser beam. (Eq. 8) results from the physical constraints imposed on laser propagation, while (Eq. 5) requires a known physical correspondence between the points $x_2$ and $X_1$.

$$x_{c2} \cdot E X_{L1} = 0 \quad \text{(Eq. 8)}$$

There are several procedures that can be used for selecting the points $x_{c2}$ and $X_{L1}$. Selection of the point $X_{L1}$ is not critical since this point is strictly conceptual and the only error in its location arises from uncertainties in the azimuth and elevation angles location associated with the rotation platform. A convenient choice is the point with unit length along the beam with coordinates $[z, x, y]=[\cos(\beta)\cos(\alpha), \cos(\beta)\sin(\alpha), \sin(\beta)]$ where "$\alpha$" is the azimuth angle and "$\beta$" is the elevation angle. Selection of $x_{c2}$ is more critical and there are several possible methods. The simplest method is to select a random point that lies on the laser image. Another method is determine the equation of the beam line using a least square fit and then selecting a point consistent with the least square fit.

One approach for performing the least square fit involves finding the centroid of beam along a column or row and then the least square fit is performed using the coordinates of the centroids. An alternative approach is to consider all image points that exceed a threshold as experimental realizations of the beam image. The least square fit is performed with all points exceeding the threshold where the threshold is set to clearly discriminate between points on the laser image and background points. A discussion on requirements for the acceptable laser orientations can be found in a publication to Zhang, Z., entitled "Camera Calibration with One-Dimensional Objects", *IEEE Transactions on Pattern Analysis and Machine Intelligence*, vol. 26, no. 7, July 2004, as well as a publication to Xiangjian, H. et al., entitled "Complete Camera Calibration Using Line-Shape Objects", *TENCON 2006, 2006 IEEE Region 10 Conference*, pp. 1-4, November 2006.

The method described above only determines a vector in the direction of T, but does not determine the magnitude of T. The magnitude of T may be determined measurement devices or techniques such as measurement sticks or tapes, surveying, interferometry, or calculated from GPS coordinates.

Alternatively, the translation vector T and rotation matrix R can be solved individually. From FIG. 3 we can see that the three vectors from the camera origin $o_C$ to the points $x_{c1}$, $x_{c2}$ and $e_c$ also lie in a plane. The point $e_c$ is the image of the laser origin in the camera frame and the vector from the camera origin $o_C$ to the point $e_c$ is proportional to the translation vector T.

The planarity of the vectors $x_{c1}$, $x_{c2}$ and $e_c$ implies that the scalar triple product given by (Eq. 9) will be equal to zero.

$$e_c \cdot x_{c1} \times x_{c2} = 0 \tag{Eq. 9}$$

The points $x_{c1}$ and $x_{c2}$ can be any two unique points on the beam image excluding the point $e_c$. The points $x_{c1}$ and $x_{c2}$ are chosen by the same procedures used to choose $x_{c2}$ when calculating T and R from the epipolar constraint. Since $x_{c1}$ and $x_{c2}$ are known, their cross product can be easily calculated. Representing the cross product of $x_{c1}$ and $x_{c2}$ by the vector c with components $(c_x, c_y, c_z)$. (Eq. 9) can be rewritten as $$e_{cx}c_x + e_{cy}c_y + e_{cz}c_z = 0 \tag{Eq. 10}$$

Or equivalently as $$\begin{pmatrix} c_x & c_y & c_z \end{pmatrix} \cdot \begin{pmatrix} e_{cx} \\ e_{cy} \\ e_{cz} \end{pmatrix} = 0, \tag{Eq. 11}$$

which is recognized as a homogeneous equation. Using standard linear algebra techniques such as single value decomposition the three components of the vector $e_c$ can be determined from a minimum of two laser orientations. This result can also be interpreted as finding the coordinates of the laser aperture in the image plane of the camera. Since T is proportional to the vector $e_c$, T is only determined to within a multiplicative constant. Again, determining the magnitude of T as discussed above solves this problem.

The rotation matrix R can now be solved. Again, referring to FIG. 5 and the discussion above on the epipolar constraint, the vectors $x_{c2}$, T, and $RX_{L1}$ lie in a plane. The triple scalar product can be written as shown in (Eq. 12) and $x_{c2}$ and $X_{L1}$ are chosen as described in the discussion of the epipolar constraint.

$$RX_{L1} \cdot x_{c2} \times T = 0 \tag{Eq. 12}$$

Representing the cross product of $x_{c2}$ and T by the vector c with components $(c_x, c_y, c_z)$ and the components of the rotation matrix R as $(R_{11}\ R_{12}\ R_{13}; R_{21}\ R_{22}\ R_{23}; R_{31}\ R_{32}\ R_{33})$; Equation 10 can be rewritten as a homogeneous equation $$\begin{pmatrix} X_{L1x}c_x & X_{L1y}c_x & X_{L1z}c_x & X_{L1x}c_y & X_{L1y}c_y & X_{L1z}c_y & X_{L1x}c_z & X_{L1y}c_z & X_{L1z}c_z \end{pmatrix} \cdot \begin{pmatrix} R_{11} \\ R_{12} \\ R_{13} \\ R_{21} \\ R_{22} \\ R_{23} \\ R_{31} \\ R_{32} \\ R_{33} \end{pmatrix} = 0 \tag{Eq. 13}$$

Using five laser orientations, the values of $R_{11}\ R_{12}\ R_{13}\ R_{21}\ R_{22}$ and $R_{23}$ can be determined. The remaining three components of the rotation matrix can be determined by taking the cross product of $(R_{11}\ R_{12}\ R_{13})$ and $(R_{21}\ R_{22}\ R_{23})$.

Figure 4:
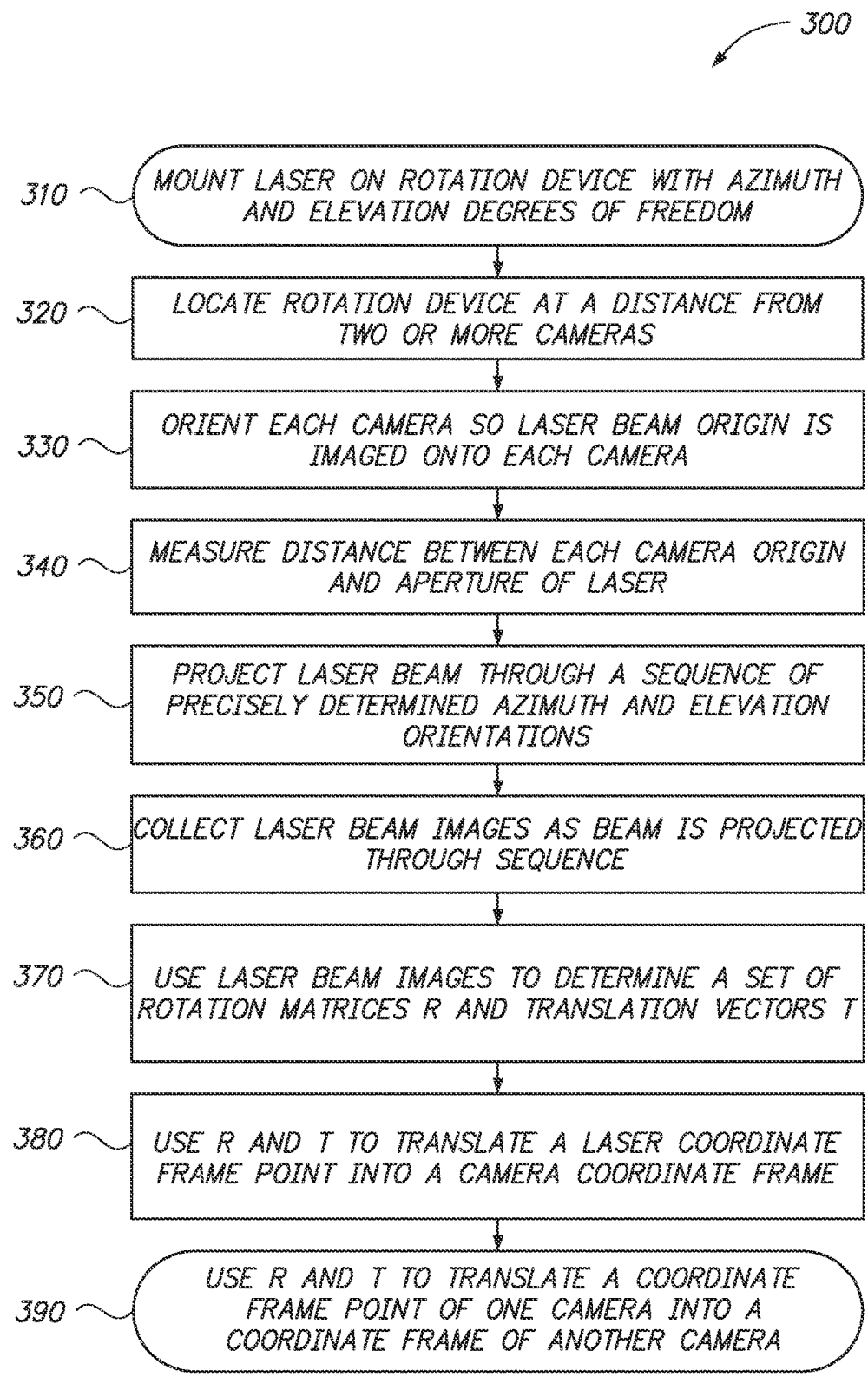
FIG. 4 shows a flowchart of an embodiment of a method in accordance with the Method for Extrinsic Camera Calibration Using a Laser Beam.

FIG. 4 shows a flowchart of an embodiment of a method 300 in accordance with the Method for Extrinsic Camera Calibration Using a Laser Beam. As an example, method 300 may be performed by system 10 and 100 as shown in FIGS. 1 and 3, and will be discussed with reference thereto. Also, while FIG. 4 shows one embodiment of method 300 to include steps 310-390, other embodiments of method 300 may contain fewer or more steps. Further, while in some embodiments the steps of method 300 may be performed as shown in FIG. 4, in other embodiments the steps may be performed in a different order, or certain steps may occur simultaneously with one or more other steps.

Method 300 may begin at step 310, which involves mounting a laser 40 on a rotation device 60 with both azimuth and elevation degrees of freedom. In some embodiments, laser 40 mounted on the rotation device 60 such that an aperture of the laser 40 is at the center of rotation of the rotation device 60. Under this condition the laser aperture corresponds to the origin of the laser coordinate system. Appropriate rotation devices 60 are commerically available. Step 320 involves locating the rotation device 60 at a distance from the locations of two or more cameras 20 and 30. Step 330 involves orienting each camera 20 and 30 such that an origin of a laser beam 50 from the laser 40 is imaged onto each camera 20 and 30.

Step 340 involves measuring the distance T between each camera origin $o_c$ 230 and the aperture of the laser $o_L$ 210. Step 350 involves projecting the laser beam 220 through a sequence of precisely determined azimuth and elevation orientations, such as by rotating rotation device 60. Step 360 involves, using each camera, collecting a plurality of laser beam images 250 of the laser beam 220 as it is projected through the sequence. The laser beam images 250 result from the remote imaging of laser radiation scattered from objects within a propagation medium. The method may be applied in any scattering medium that has the necessary scattering and transmission properties that allow the laser beam to be imaged by the cameras. Non-limiting examples of the propagation medium include an atmospheric medium and a liquid medium. Step 370 involves using the plurality of laser beam images to determine a set of rotation matrices R and translation vectors T. Step 370 is discussed in more detail with respect to FIGS. 5 and 6.

Method 300 may then proceed to step 380, which involves translating a point in a coordinate frame of the laser 210 into a coordinate frame of each of the cameras 230 using the set of rotation matrices R and the set of translation vectors T. More specifically, if there are n cameras there will be n rotation matrices and n corresponding translation vectors and the $i^{th}$ rotation matrix and the $i^{th}$ translation vector will transform a point in the laser coordinate system into the coordinate system attached to the $i^{th}$ camera. Further, the rotation matrix and translation vector that will transform a point in the coordinate system attached to the $i^{th}$ camera into the coordinate system attached to the $k^{th}$ camera can be determined from the $R_i$ and $R_k$ rotation matrices and the $T_i$ and $T_k$ translation vectors.

In some embodiments, method 300 then proceeds to step 390, which involves translating a point in a coordinate frame of one of the cameras 230 into a coordinate frame of another of the cameras using the set of rotation matrices R and the set of translation vectors T. In some embodiments, method 300 proceeds from step 370 directly to step 390. In some embodiments, steps 380 and 390 are performed simultaneously.

Figure 5:
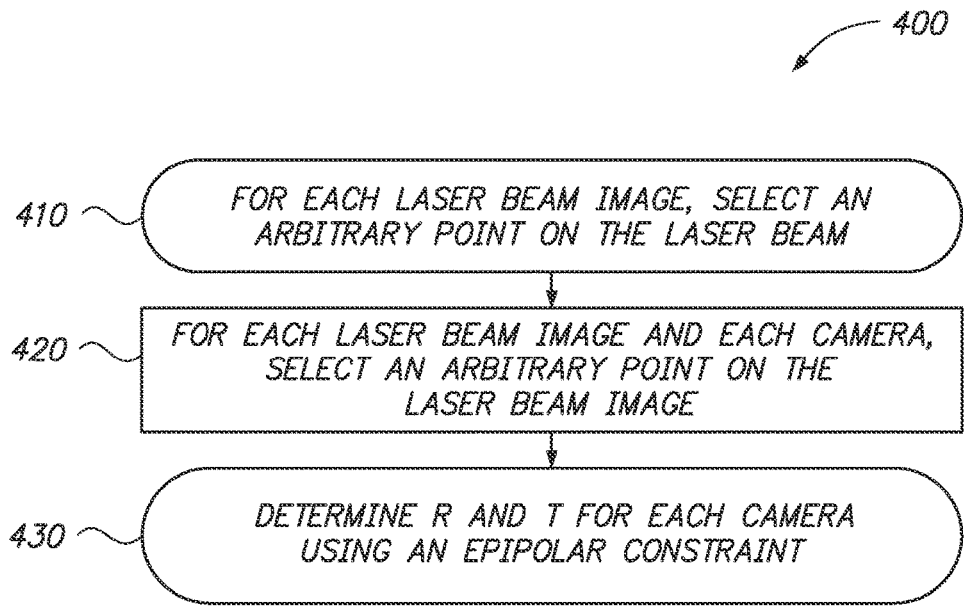
FIG. 5 shows a flowchart of an embodiment of a step for using the plurality of laser beam images to determine a set of rotation matrices R and translation vectors T.

FIG. 5 shows flowchart of an embodiment of a step 400 for using the plurality of laser beam images to determine a set of rotation matrices R and translation vectors T. Step 400 may be used for step 370 shown in FIG. 4. Step 400 may begin at step 410, which involves, for each laser beam image 250, selecting an arbitrary point $P_1$ 222 on the laser beam 220 in a laser coordinate system, where the origin of the laser coordinate system corresponds with an aperture of the laser $o_L$ 210. In some embodiments, the arbitrary point $P_1$ 222 on the laser beam 220 is a point a unit length along the path of the laser beam 220.

Step 420 involves, for each camera 230 and each laser beam image 250, selecting an arbitrary point $x_{c1}$ 252 on the laser beam image. In some embodiments, the arbitrary point $x_{c1}$ 252 on the laser beam image 250 is a point consistent with a least square fit to the image of the laser beam 220.

Step 430 involves determining a rotation matrix R and a unit vector along the translation vector T for each camera 230 using an epipolar constraint. In some embodiments, the epipolar constraint is determined according to the equation $x_2 \cdot T \times Rx_1 = x_2 \cdot Ex_1 = 0$, where $x_1$ and $x_2$ correspond to the known locations of points $X_1$ and $X_2$ in frames of each of the cameras 230 expressed in terms of image planes 240 of each of the cameras 230, where E is the essential matrix and is formed by $T \times R$. In some embodiments, step 430 also involves, in addition to using an epipolar constraint, using an appropriate algorithm, such as the 8-point algorithm described in a publication by Tiberiu, M., entitled "Camera Calibration Method for Far Range Stereovision Sensors Used in Vehicles", 2006 IEEE Intelligent Vehicles Symposium, pp. 356-63, 2006.

Figure 6:
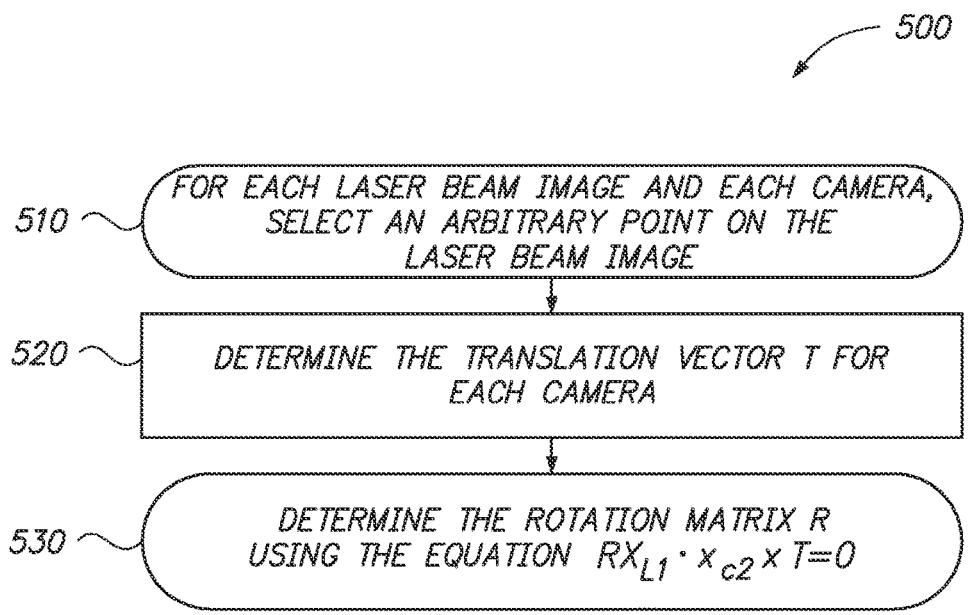
FIG. 6 shows a flowchart of another embodiment of a step for using the plurality of laser beam images to determine a set of rotation matrices R and translation vectors T.

FIG. 6 shows flowchart of an embodiment of a step 500 for using the plurality of laser beam images 250 to determine a set of rotation matrices R and translation vectors T. Step 500 may be used for step 370 shown in FIG. 4. Step 500 may begin at step 510, which involves, for each camera 230 and each laser beam image 250, selecting an arbitrary point $x_{c1}$ 252 on the laser beam image. In some embodiments, the arbitrary point $x_{c1}$ 252 on the laser beam image 250 is a point consistent with a least square fit to the image of the laser beam. Step 520 involves determining a translation vector T for each camera 230 by taking the product of the measured magnitude of the translation vector with its corresponding unit vector. Step 530 involves determining a rotation matrix R using the equation $RX_{L1} \cdot x_{c2} \times T = 0$, where $X_{L1}$ is an arbitrary point in a laser image frame that lies on the laser beam 220 and $x_{c2}$ is an arbitrary point in a camera image frame 240 that lies on the laser beam image 250.

Some or all of the steps of method 300 may be stored on a computer-readable storage medium, such as a non-transitory computer-readable storage medium, wherein the steps are represented by computer-readable programming code. The steps of method 300 may also be computer-implemented using a programmable device, such as a computer-based system. Method 300 may comprise instructions that may be stored within a processor or may be loaded into a computer-based system, such that the processor or computer-based system then may execute the steps of method 300. Method 300 may be implemented using various programming languages, such as "Java", "C" or "C++".

Various storage media, such as magnetic computer disks, optical disks, and electronic memories, as well as non-transitory computer readable storage media and computer program products, can be prepared that can contain information that can direct a device, such as a micro-controller or processor, to implement method 300. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Figure 7:
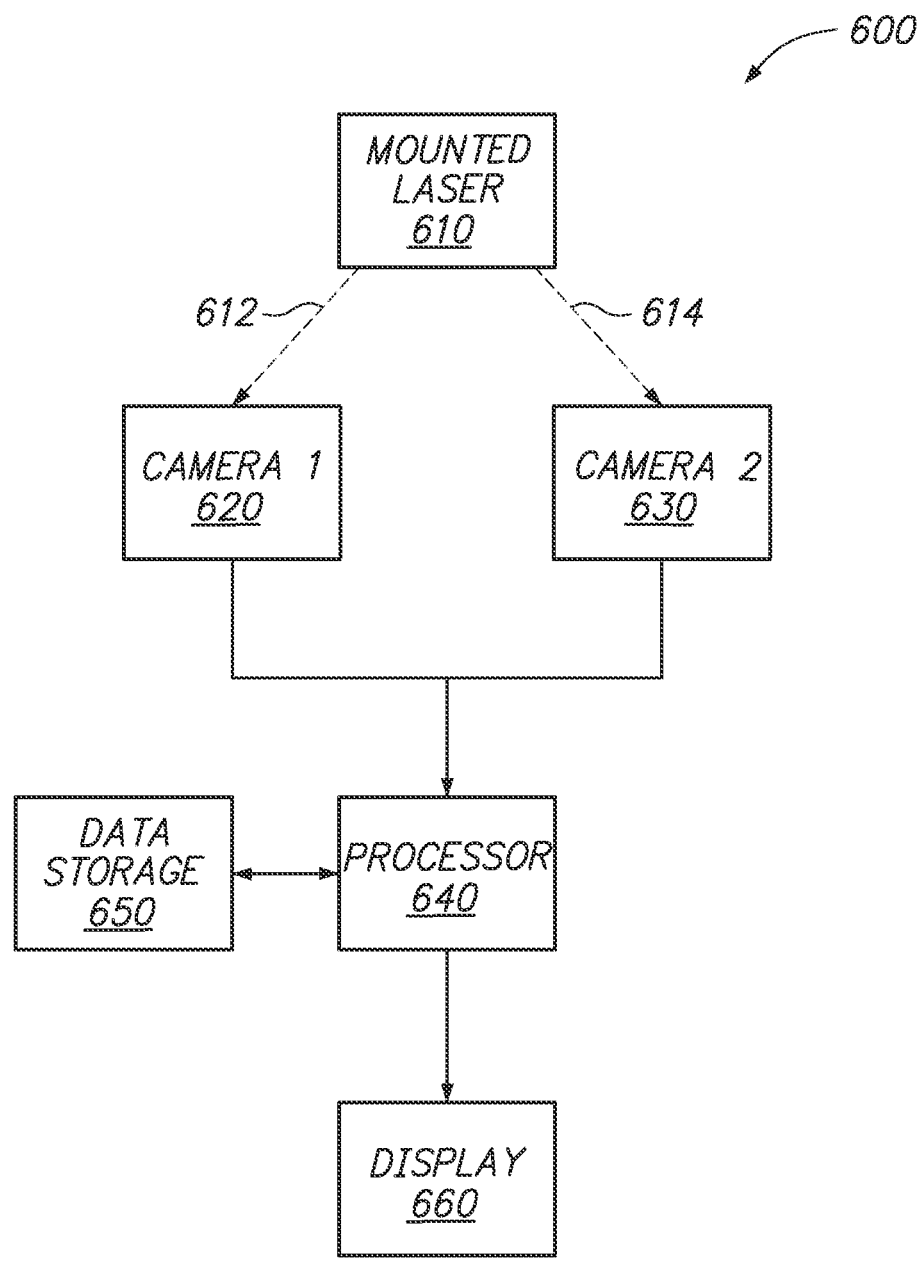
FIG. 7 shows a block diagram illustrating an embodiment of a system that may be used in accordance with the Method for Extrinsic Camera Calibration Using a Laser Beam.

Method 300 may also be performed using a system such as that shown in FIG. 7. FIG. 7 shows a diagram 600 of an embodiment of a system that may be used in accordance with the embodiments of method 300 discussed herein. As shown, a mounted laser 610 (laser mounted on a rotation device as discussed above) transmits a laser beam (not shown) into the atmosphere. An image of the laser beam 612 is projected into the focal plane of a first camera 620 and an image of the laser beam 614 is projected into the focal plane of second camera 630. As an example, cameras 620 and 630 may be digital video cameras or any other camera suitable for the purposes described herein as recognized by one having ordinary skill in the art.

Cameras 620 and 630 are connected to a processor 640, which receives input from cameras 620 and 630 and performs the various calculations and determinations of method 300 as discussed above. In some embodiments, the rotation device on which the laser is mounted is also connected to processor 640 such that processor 640 may provide commands to cause the laser to be oriented at various azimuth and elevation angles in accordance with the disclosed method. In some embodiments, an external controller may be used for such purpose.

Processor 640 may include computer-implementable instructions represented by computer-readable programming code stored therein, with such instructions configured to perform some or all of the steps of method 300. Processor 640 may be any device configured to perform computations on the input received from cameras 620 and 630 and to provide instructions to mounted laser 610. For example, processor 640 may be a commercially available computing device that has been modified to include programming instructions therein to allow processor 640 to perform some or all of the steps of method 300.

A data storage device 650 may connected to processor 640. Data storage 650 may contain data and/or instructions stored therein for use by processor 640 in performing some or all of the steps of method 300. As an example, data storage device 650 may be any standard memory device, such as EEPROM, EPROM, RAM, DRAM, SDRAM, or the like. Input data, as received from cameras 620 and 630, may be stored in data storage 650 in various ways, such as in a table format or other format as recognized by one having ordinary skill in the art. Processor 640 may be configured to provide an output to display 660. In some embodiments, such output may include information regarding the specifics of the extrinsic calibration parameters of the cameras. Display 660 may comprise any commercially available display. As an example, display 660 may be liquid crystal display.

Many modifications and variations of the Method for Extrinsic Camera Calibration Using a Laser Beam are possible in light of the above description. Within the scope of the appended claims, the embodiments of the subject matter described herein may be practiced otherwise than as specifically described. The scope of the claims is not limited to the implementations and the embodiments disclosed herein, but extends to other implementations and embodiments as may be contemplated by those persons having ordinary skill in the art.

I claim:

1. A method comprising the steps of:
   mounting a laser on a rotation device with both azimuth and elevation degrees of freedom;
   locating the rotation device at a distance from the locations of two or more cameras;
   orienting each camera such that an origin of a laser beam from the laser is imaged onto each camera;
   measuring the distance between each camera origin and the aperture of the laser;
   projecting the laser beam through a sequence of precisely determined azimuth and elevation orientations;
   using each camera, collecting a plurality of laser beam images of the laser beam as it is projected through the sequence; and
   for each laser beam image, selecting an arbitrary point on the laser beam in a laser coordinate system, wherein the origin of the laser coordinate system corresponds with an aperture of the laser;
   for each camera and each laser beam image, selecting an arbitrary point on the laser beam image; and
   determining a rotation matrix R and a unit vector along a translation vector T for each camera using an epipolar constraint, wherein the epipolar constraint is determined according to the equation $x_2 \cdot T \times R x_1 = x_2 \cdot E x_1 = 0$, where $x_1$ and $x_2$ correspond to the known locations of points $X_1$ and $X_2$ in frames of each of the cameras expressed in terms of image planes of each of the cameras, where E is the essential matrix and is formed by $T \times R$.

2. The method of claim 1 further comprising the step of translating a point in a coordinate frame of the laser into a coordinate frame of each of the cameras using the set of rotation matrices R and the set of translation vectors T.

3. The method of claim 1 further comprising the step of translating a point in a coordinate frame of one of the cameras into a coordinate frame of another of the cameras using the set of rotation matrices R and the set of translation vectors T.

4. The method of claim 1, wherein the arbitrary point on the laser beam is a point a unit length along the path of the laser beam.

5. The method of claim 1, wherein the arbitrary point on the laser beam image is a point consistent with a least square fit to the image of the laser beam.

6. The method of claim 1, wherein the laser beam images result from the remote imaging of laser radiation scattered from objects within a propagation medium.

7. The method of claim 6, wherein the propagation medium is one of an atmospheric medium and a liquid medium.

8. The method of claim 1, wherein the laser is mounted on the rotation device such that an aperture of the laser is at the center of rotation of the rotation device.

9. A method comprising the steps of:
   mounting a laser on a rotation device with both azimuth and elevation degrees of freedom;
   locating the rotation device at a distance from the locations of two or more cameras;
   orienting each camera such that an origin of a laser beam from the laser is imaged onto each camera;
   measuring the distance between each camera origin and the aperture of the laser;
   projecting the laser beam through a sequence of precisely determined azimuth and elevation orientations;
   using each camera, collecting a plurality of laser beam images of the laser beam as it is projected through the sequence;
   for each laser beam image, selecting an arbitrary point on the laser beam in a laser coordinate system, wherein the origin of the laser coordinate system corresponds with the aperture of the laser, wherein the arbitrary point on the laser beam is a point a unit length along the path of the laser beam;
   for each camera and each laser beam image, selecting an arbitrary point on the laser beam image, wherein the arbitrary point on the laser beam image is a point consistent with a least square fit to the image of the laser beam; and
   determining a rotation matrix R and a unit vector along the translation vector T for each camera using an epipolar constraint, wherein the epipolar constraint is determined according to the equation $x_2 \cdot T \times Rx_1 = x_2 \cdot Ex_1 = 0$, where $x_1$ and $x_2$ correspond to the known locations of points $X_1$ and $X_2$ in frames of each of the cameras expressed in terms of image planes of each of the cameras, where E is the essential matrix and is formed by $T \times R$.

10. The method of claim 9 further comprising the step of translating a point in a coordinate frame of the laser into a coordinate frame of each of the cameras using the set of rotation matrices R and the set of translation vectors T.

11. The method of claim 9 further comprising the step of translating a point in a coordinate frame of one of the cameras into a coordinate frame of another of the cameras using the set of rotation matrices R and the set of translation vectors T.

12. The method of claim 9, wherein the laser is mounted on the rotation device such that the aperture of the laser is at the center of rotation of the rotation device.

13. A method comprising the steps of:
mounting a laser on a rotation device with both azimuth and elevation degrees of freedom;
locating the rotation device at a distance from the locations of two or more cameras;
orienting each camera such that an origin of a laser beam from the laser is imaged onto each camera;
measuring the distance between each camera origin and the aperture of the laser;
projecting the laser beam through a sequence of precisely determined azimuth and elevation orientations;
using each camera, collecting a plurality of laser beam images of the laser beam as it is projected through the sequence;
for each camera and each laser beam image, selecting an arbitrary point on the laser beam image, wherein the arbitrary point on the laser beam image is a point consistent with a least square fit to the laser beam image;
determining a translation vector T for each camera by taking the product of the measured magnitude of the translation vector with its corresponding unit vector; and
determining a rotation matrix R using the equation $RX_{L1} \cdot x_{c2} \times T = 0$, where $X_{L1}$ is an arbitrary point in a laser image frame that lies on the laser beam and $x_{c2}$ is an arbitrary point in a camera image frame that lies on the laser beam image.

14. The method of claim 13 further comprising the step of translating a point in a coordinate frame of the laser into a coordinate frame of each of the cameras using the set of rotation matrices R and the set of translation vectors T.

15. The method of claim 13 further comprising the step of translating a point in a coordinate frame of one of the cameras into a coordinate frame of another of the cameras using the set of rotation matrices R and the set of translation vectors T.

\* \* \* \* \*